Dec. 8, 1931.  G. CAPRONI  1,835,846
AEROPLANE FUSELAGE FITTED WITH ARRANGEMENTS FOR
CARRYING AND DROPPING LARGE BOMBS
Filed Dec. 5, 1929
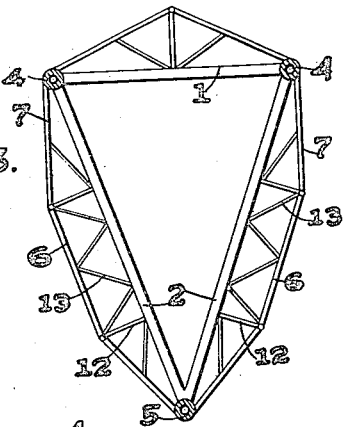
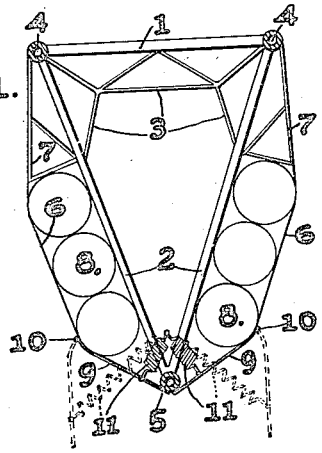
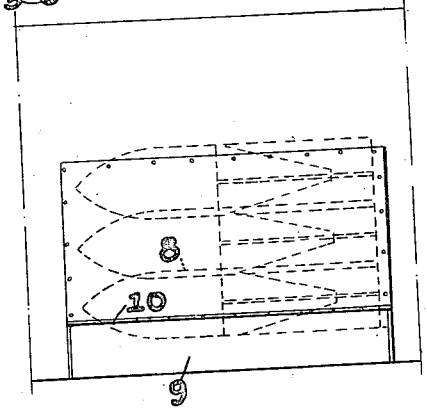
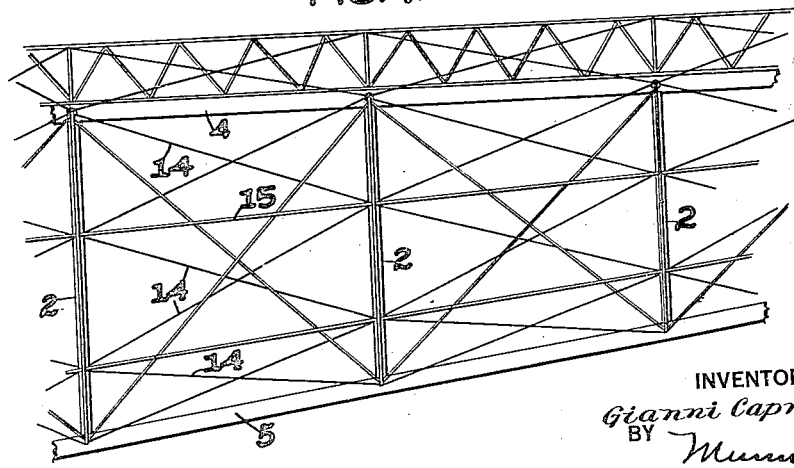
INVENTOR
Gianni Caproni
BY Munn &Co.
ATTORNEY Patented Dec. 8, 1931

UNITED STATES PATENT OFFICE

GIANNI CAPRONI, OF ROME, ITALY

AEROPLANE FUSELAGE FITTED WITH ARRANGEMENTS FOR CARRYING AND DROPPING LARGE BOMBS

Application filed December 5, 1929, Serial No. 411,943, and in Italy December 10, 1928.

Various arrangements have been proposed for carrying bombs on aeroplanes by taking advantage of the fuselage for this purpose to the end of providing the latter with additional structures, between which and the fuselage the bombs are carried. However, in all such arrangements the structure of the fuselage is unduly strained by the weight of the bombs, both on account of the circular or polygonal section which the fuselage possesses, as well as on account of the absence of additional trussing that is rendered necessary to take up the additional strain due to the weight of the bombs.
The object of the present invention is an aeroplane constructed with a triangular fuselage fitted with an arrangement for carrying large bombs, without any need of interfering with the resisting structure, and which is also provided with means fit for dropping bombs.

In the accompanying drawings which show schematically a preferred embodiment of the invention, Figures 1 and 2 show respectively in cross section and in fractional side view a triangular fuselage with bombs, and
Figures 3 and 4 show in transverse section and in side view the same object of the invention without bombs, thus allowing the various structures to be shown.

As will be seen from the drawings, the fuselage consists substantially of transversal rectilinear elements 1 and 2, 2 connected in a triangle and which serve to stiffen the longitudinal elements 4, 4 and 5. Over this central structure for a certain length is arranged externally a peripheric structure shaped as a symmetric polygon in respect to the median longitudinal plane and formed by elements 6—7 stiffened and strengthened by stays 3.

Between elements 6 and 2 are provided the housings for the bombs 8, which are symmetrically arranged therein one above the other.

Said bombs are secured in the fuselage on the structural and more solid parts thereof, and in order to cause them to drop, it suffices to put into action a supporting device after having opened one of the two shutters 9 mounted on hinge 10 and subject to th action of springs 9 which get stretched dur ing the opening of the shutters 11 whicl close automatically after the dropping o each bomb. The shutters 11, as it is evident may be operated simultaneously or separate ly, or be opened automatically by the weigh of the bomb at the moment the latter i dropped.

The shape of the transversal section of th fuselage may vary in different manners, an by way of example a triangular shape ha been shown, but it might also be rectangular The connection of the structure containin; the bombs with the outer wall of the fuselag at the top, below and with the fore and rea: parts is better shown in Figures 3 and 4 where 12 and 13 indicate the elements fo: the front and rear connection.

Claims:
1. An aeroplane fuselage for carrying larg bombs comprising a cross sectionally trian gular base frame, trussing on the inside o said frame, a pair of peripheric structure mounted on the outside of the base frame said structures providing spaces adjacent t the lateral walls of said base frame for th emplacement of bombs, and shutters pro vided at the lower ends of the structures.

2. An aeroplane fuselage comprising ai approximately triangular base frame, a po lygonal outrigger bomb frame attached t the base frame, and a spring shutter pro viding a closure for an otherwise open en of the outrigger frame.

In testimony whereof I have affixed m signature this 16th day of November, 1929.

GIANNI CAPRONI.